US012747128B2

(12) United States Patent
Jiang

(10) Patent No.: US 12,747,128 B2
(45) Date of Patent: Sep. 29, 2026

(54) COILER DEVICE FOR WINDING A STRIP OF CUSHIONING MATERIAL

(71) Applicant: Intertape Polymer Corp., Sarasota, FL (US)

(72) Inventor: Wenyong Jiang, Guangdong (CN)

( * ) Notice: Subject to any disclaimer, the term of this patent is extended or adjusted under 35 U.S.C. 154(b) by 239 days.

(21) Appl. No.: 18/553,705

(22) PCT Filed: Apr. 8, 2021

(86) PCT No.: PCT/CN2021/085884
§ 371 (c)(1),
(2) Date: Oct. 2, 2023

(87) PCT Pub. No.: WO2022/213314
PCT Pub. Date: Oct. 13, 2022

(65) Prior Publication Data

US 2024/0109747 A1 Apr. 4, 2024

(51) Int. Cl.
*B65H 54/58* (2006.01)
*B31D 5/00* (2017.01)

(52) U.S. Cl.
CPC ......... *B65H 54/585* (2013.01); *B31D 5/0039* (2013.01); *B31D 2205/007* (2013.01); *B65H 2220/02* (2013.01); *B65H 2701/1944* (2013.01)

(58) Field of Classification Search
USPC ........................ 242/578, 578.1, 578.2, 578.3
See application file for complete search history.

(56) References Cited

U.S. PATENT DOCUMENTS

| | | | | |
|---|---|---|---|---|
| 3,934,854 | A | 1/1976 | Goode | |
| 5,908,375 | A | 6/1999 | Simmons et al. | |
| 6,206,317 | B1 * | 3/2001 | Harvestine | B65H 54/585 242/395 |
| 6,267,319 | B1 * | 7/2001 | Hoffmann | B65H 54/585 242/395 |
| 6,606,839 | B1 * | 8/2003 | Suda | B65B 63/024 53/430 |

(Continued)

FOREIGN PATENT DOCUMENTS

| | | | |
|---|---|---|---|
| DE | 10 2018 007549 | A1 | 3/2020 |
| FR | 2058036 | A5 | 5/1971 |

(Continued)

OTHER PUBLICATIONS

WO2022213314A1 Written Opinion filed in PCT/CN2021/085884.

(Continued)

*Primary Examiner* — William A. Rivera
(74) *Attorney, Agent, or Firm* — Jeffrey R. Gray; Moore & Van Allen PLLC

(57) ABSTRACT

A coiler device for winding a strip of cushioning material into a coil is disclosed. The coiler device includes a working plate, at least two winding pins and a driving mechanism. The working plate has a working surface, a rotation axis and at least two holes away from the rotation axis. The at least two winding pins are disposed through the at least two holes and protruding out of the working surface respectively when winding the strip. The driving mechanism is configured to rotate the working plate, wherein the at least two winding pins are retractable from the working plate through the at least two holes respectively.

21 Claims, 12 Drawing Sheets

(56) References Cited

U.S. PATENT DOCUMENTS

| | | | | |
|---|---|---|---|---|
| 6,626,813 | B1 * | 9/2003 | Ratzel | B65H 18/08 493/464 |
| 7,429,013 | B2 * | 9/2008 | Ward | B65H 23/02 242/578.1 |
| 10,414,624 | B1 * | 9/2019 | Berry | B65H 75/425 |
| 11,673,361 | B2 * | 6/2023 | Van Der Kaap | B31D 5/0069 242/533.7 |
| 12,415,329 | B2 * | 9/2025 | Schalk | B31D 5/0039 |
| 2004/0089761 | A1 * | 5/2004 | Tsao | A62C 33/04 242/532.6 |
| 2006/0006274 | A1 * | 1/2006 | Holub | B65B 63/024 53/119 |
| 2008/0302904 | A1 | 12/2008 | Pistner | |
| 2022/0040953 | A1 | 2/2022 | Schalk | |

FOREIGN PATENT DOCUMENTS

| | | | |
|---|---|---|---|
| FR | 2 708 259 | A1 | 2/1995 |
| FR | 2 814 681 | A1 | 4/2002 |
| WO | 2017053611 | A1 | 3/2017 |

OTHER PUBLICATIONS

WO2022213314A1 International Search Report filed in PCT/CN2021/085884.

Chinese Patent Office; Office Action for Chinese Patent Application No. 202180096901.3 dated Jan. 27, 2026, 18 Pages.

* cited by examiner

COILER DEVICE FOR WINDING A STRIP OF CUSHIONING MATERIAL

PRIORITY CLAIM AND CROSS-REFERENCE TO RELATED APPLICATIONS

This application is the National Stage filing under 35 U.S.C. 371 of International Application No. PCT/CN2021/085884 filed on Apr. 8, 2021, entitled "COILER DEVICE FOR WINDING A STRIP OF CUSHIONING MATERIAL", the entire contents of which are incorporated by reference herein in their entirety.

TECHNICAL FIELD

The present invention is generally related to a coiler device, especially a coiler device which can wind a 3-dimensional strip of dunnage or cushioning material fed from a cushioning dispenser.

BACKGROUND

Cushioning material can be formed or pre-folded into strips of 3-dimensional form for using. In common practice, a strip of dunnage or cushioning material is winded to a pre-selected, via the controls, diameter, or length of coil cushioning material. The cushioning dispenser may cut or separate the strip of dunnage or cushioning material at the end of the pre-set diameter or length. The coiler device winding pins, or a winding device may rotate till the strip of dunnage or cushioning material is pulled out or released from the cushioning dispenser outlet or chute which can be a guide plate, spring loaded, a driven hinging outlet or chute, able to guide or to adapt to the coil diameter when winding the material.

A new pre-set diameter or length cycle may be started after the coiled material is removed from the coiling device, so called manual mode or take-out mode. The coiled cushioning material may contain an open end from the strip of dunnage or cushioning material, were cut or separated, and need to be hold manual or automatically, removing the coil from the device, to avoid that the strip of coiled cushioning material opens from his coiled shape.

When the coiled cushioning material is closed at his cut or separated end, the coil is in an endless shape which makes it able to remove or release the coiled cushioning material from a coiler device without changing of his coiled shape. Therefore, there is a need to automatically release the formed coil without manual operation. In addition, safety issue might be a concern when the coil winding pins or winding device starts rotating or rotates before a strip of dunnage or cushioning material, feed from the cushioning dispenser outlet or chute, is reached and winded over the coil winding pins or winding device.

SUMMARY

In accordance with one aspect of the present invention, a coiler device for winding a strip of cushioning material into a coil is provided. The coiler device includes a working plate, at least two winding pins and a driving mechanism. The working plate has a working surface, a rotation axis and at least two holes away from the rotation axis. The at least two winding pins are disposed through the at least two holes and protruding out of the working surface respectively when winding the strip. The driving mechanism is configured to rotate the working plate, wherein the at least two winding pins are retractable from the working plate through the at least two holes respectively.

In accordance to another aspect of the present invention, a coiler device for winding a strip of cushioning material into a coil is provided. The coiler device includes a working plate and at least two winding pins. The working plate has a working surface and a rotation axis. The at least two winding pins are disposed away from the rotation axis and protruding out of the working surface respectively when winding the strip, and at least one of the at least two winding pins are bendable.

In accordance to yet another aspect of the present invention, a coiler device for winding a strip of cushioning material into a coil is provided. The coiler device includes a main body, a working plate having a working surface and a rotation axis, at least two winding pins protruding out of the working surface when winding the strip and a driving mechanism configured to rotate the working plate with respect to the rotation axis. The working plate may include at least one hole away from the rotation axis and the at least one of the two winding pins is disposed through the at least one hole to be retractable into the main body through the at least one hole.

DETAILED DESCRIPTION

The present invention will now be described more specifically with reference to the following embodiments. It is to be noted that the following descriptions of preferred embodiments of this invention are presented herein for the purposes of illustration and description only; they are not to be exhaustive or to be limited to het precise form disclosed.

Figure 1:
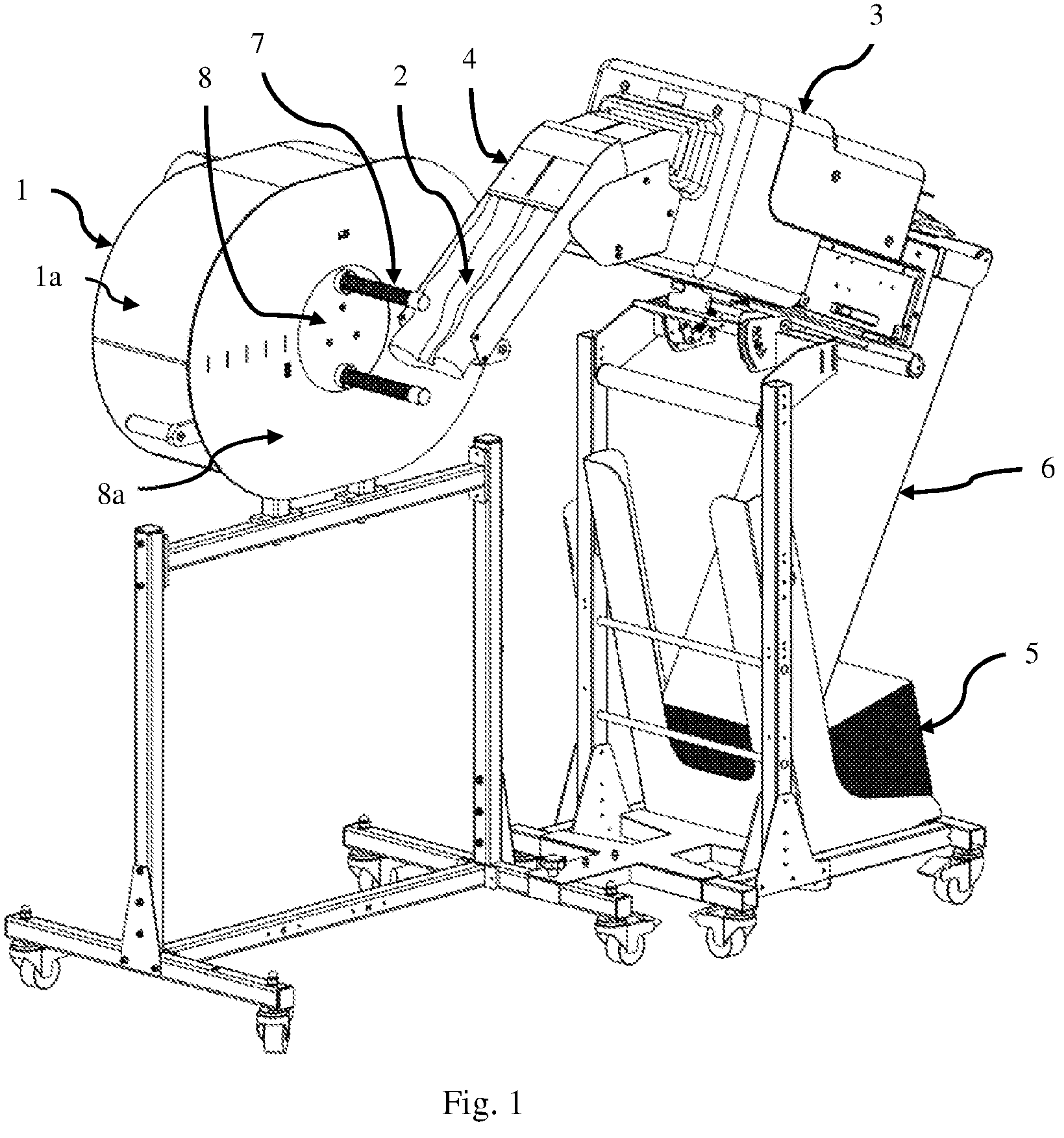
FIG. 1 is a schematic diagram showing a coiler device configured to wind a 3-dimensional strip of cushioning material fed by a cushioning dispenser, according to one embodiment of the present invention.

Please refer to FIG. 1, which illustrates a coiler device 1 configured to wind a 3-dimensional strip of dunnage or cushioning material 2 fed by a cushioning dispenser 3, through an outlet or chute 4. In some embodiments, the stock material 5 converted by the cushioning dispenser 3 is a paper-based roll of sheet material, a bundle of chain sheet material, a bundle of pre-configured chain sheet material, a pre-folded chain sheet material and/or an endless pallet of chain sheet material. These sheet materials 6 may be a single ply or multi ply configuration.

The coil diameter of a coiled cushioning material may vary between the 300 mm and 1200 mm but may be less or more depending on the actual material and/or density of the used strip of dunnage or cushioning material, as a cushioning dispenser may also dispense an inflated cushioning material such as a paper based void fill, a wrapping material or a bubble-wrap or airbag's, based on a plastic or biodegradable stock material.

Figure 2:
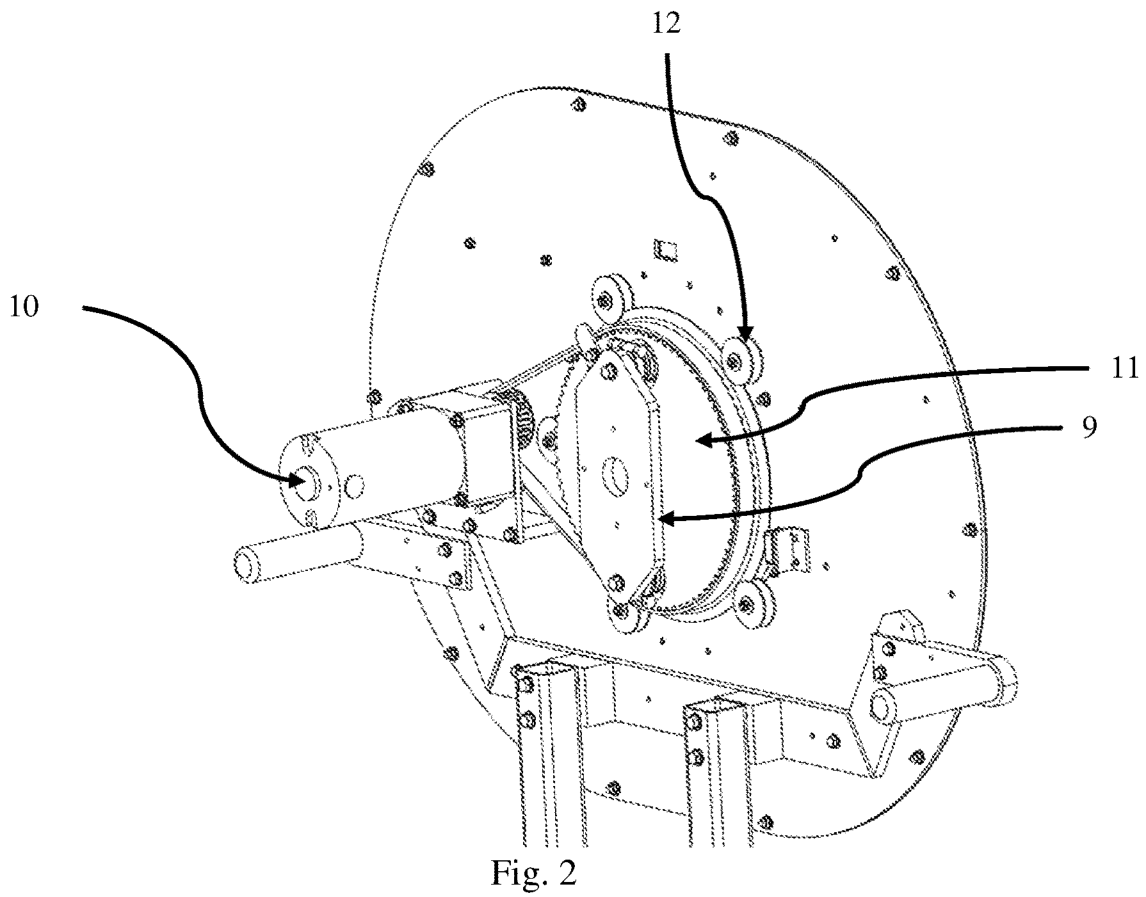
FIG. 2 is a schematic diagram showing the driving mechanism viewed from the rare side of the working plate, according to one embodiment of the present invention.
Figure 3:
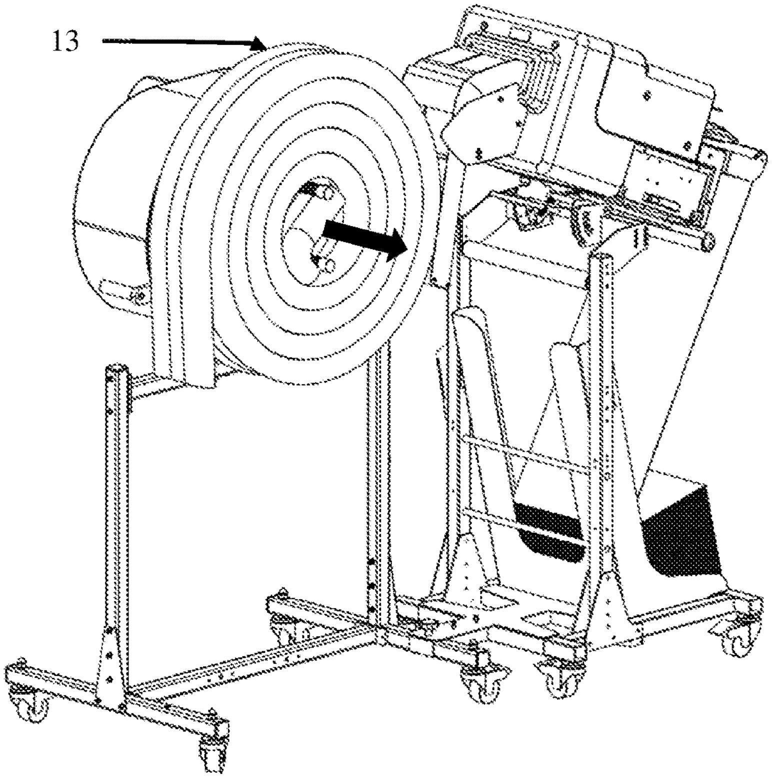
FIG. 3 is a schematic diagram showing the coil of cushioning material is formed and released from the front side of the working plate, according to another embodiment of the present invention.

Combined FIGS. 1-3, the coiler device 1 is provided with at least 2 coil winding pins 7. In some embodiments, at least 1 pin 7 is made from a flexible material such as a tension spring, rubber or possible from a solid material that can hinge on his center pivot point. These pins 7 may be mounted fix to a driven rotational center plate 8 or mounted to a separate frame 9, which is attached to a driven member 10 whereby the pins 7 are positioned through holes 15 of a floating center rotational plate or gear member 11 driven by the pins 7 or mounted fix to the rotational center plate 11*a* able to rotate the pins 7 in the center of a coil axis to wind a strip of dunnage or cushioning material 2 to a coiled cushioning material 13. The driven rotational center plate 8 includes a working surface 8*a* facing the cushioning dispenser 3.

Figure 2A:
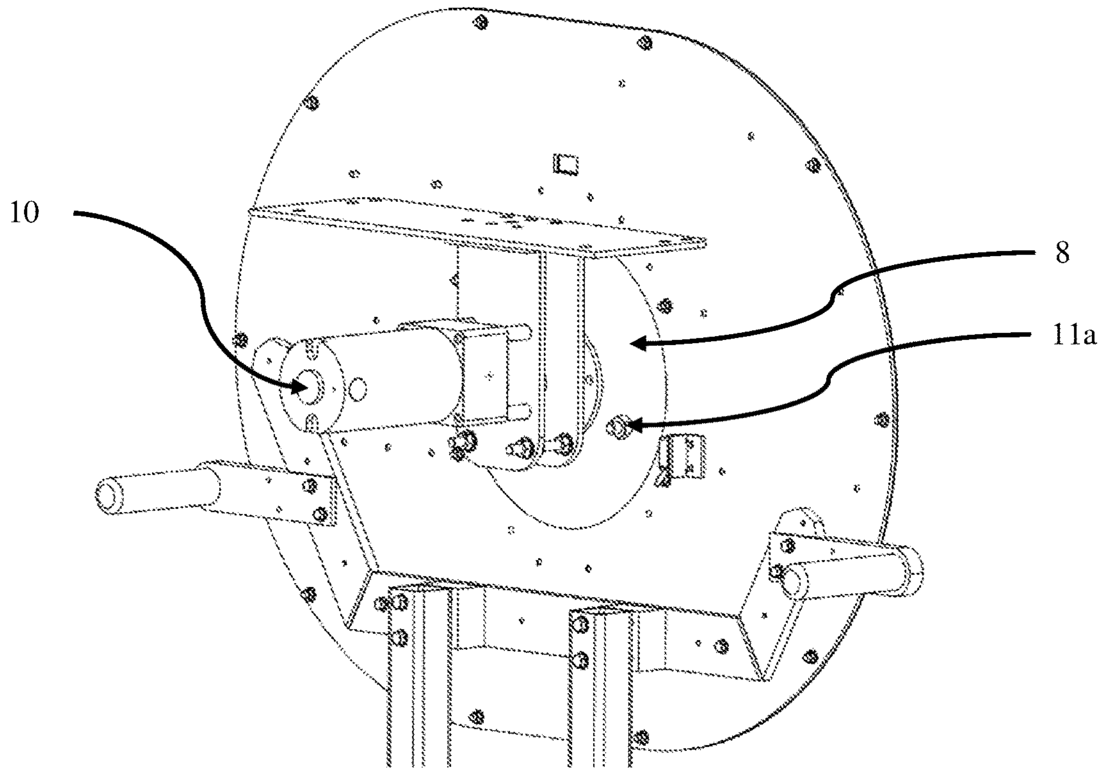
FIG. 2*a* is a schematic diagram showing the driving mechanism viewed from the rare side of the working plate, according to another embodiment of the present invention.

In FIGS. 2 and 2*a*, a floating center rotational plate 11, which may be V-shaped at the outer edge thereof, may be kept axial and radial positioned by one or several bearings or V-shaped bearing track wheels (12). The force needed, before 1 or multiple pins tempt to bend or pivoting, is at least at an equal or higher force than required for winding a strip of dunnage or cushioning material 2, and at least require less force, able to bend 1 or multiple pins before injuring a person who could get in contact with the coiler device pin or pins 7.

Figure 4:
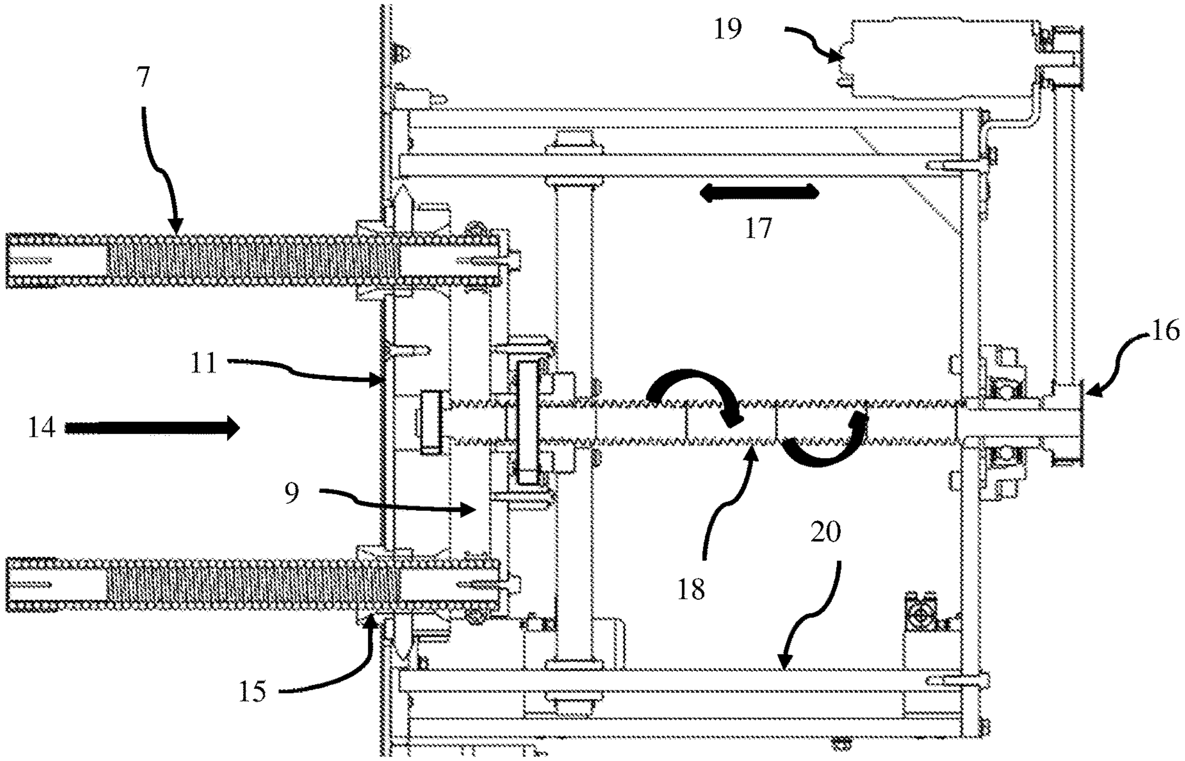
FIGS. 4-5 are partial sectional diagrams showing an embodiment of the linear movement device coupled to the frame and guiding the frame along a direction parallel to the rotation axis.
Figure 5:
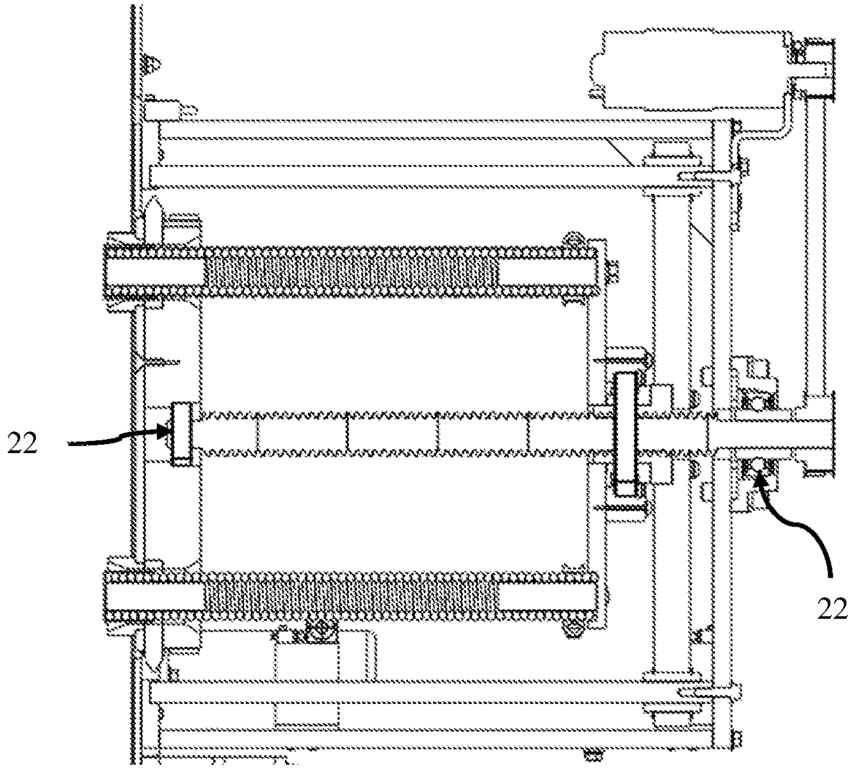
Figure 8:
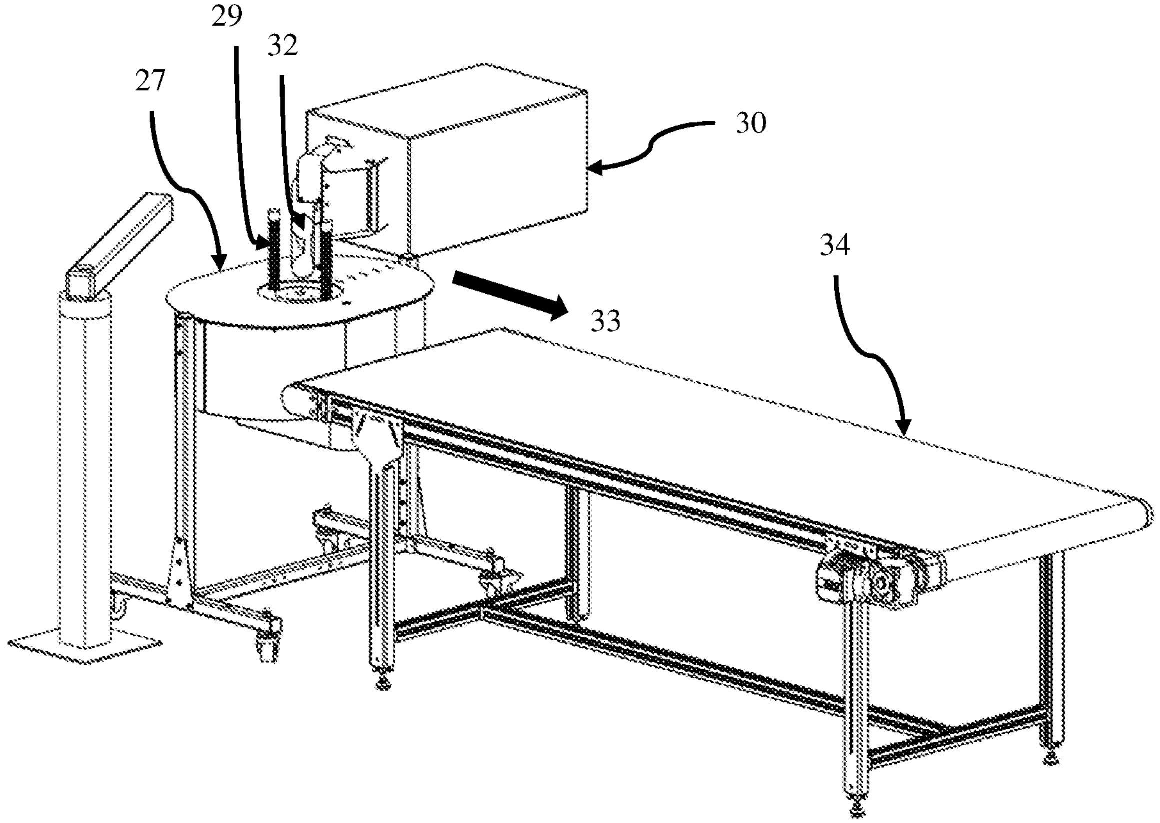
FIGS. 8-14 are schematic diagrams showing a coiler device configured to wind a strip of cushioning material fed by a cushioning dispenser and release the formed coils of cushioning material, according to some embodiments of the present invention.
Figure 9:
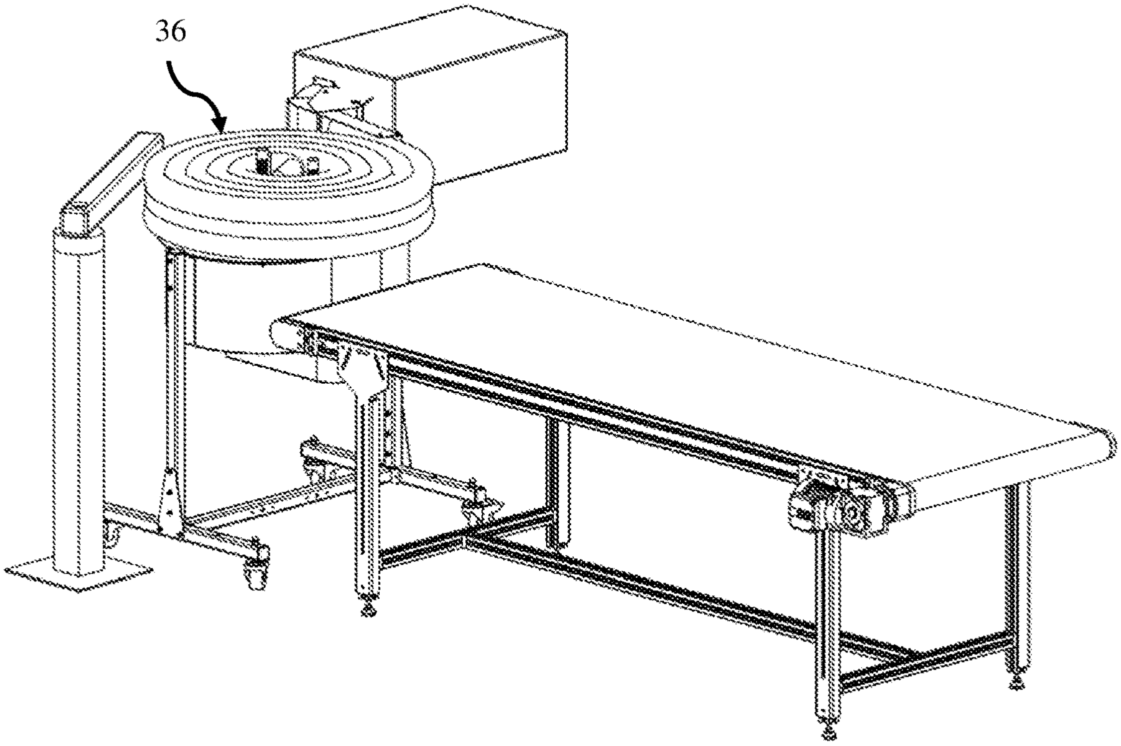
Figure 10:
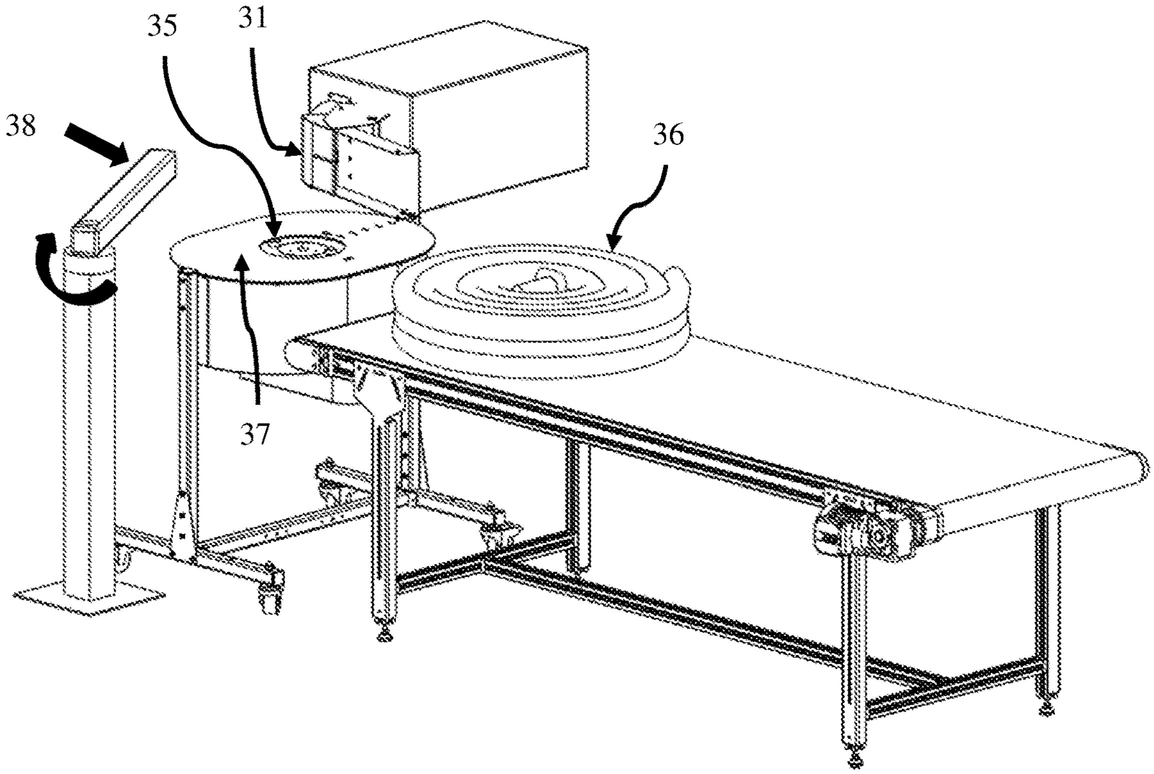
Figure 11:
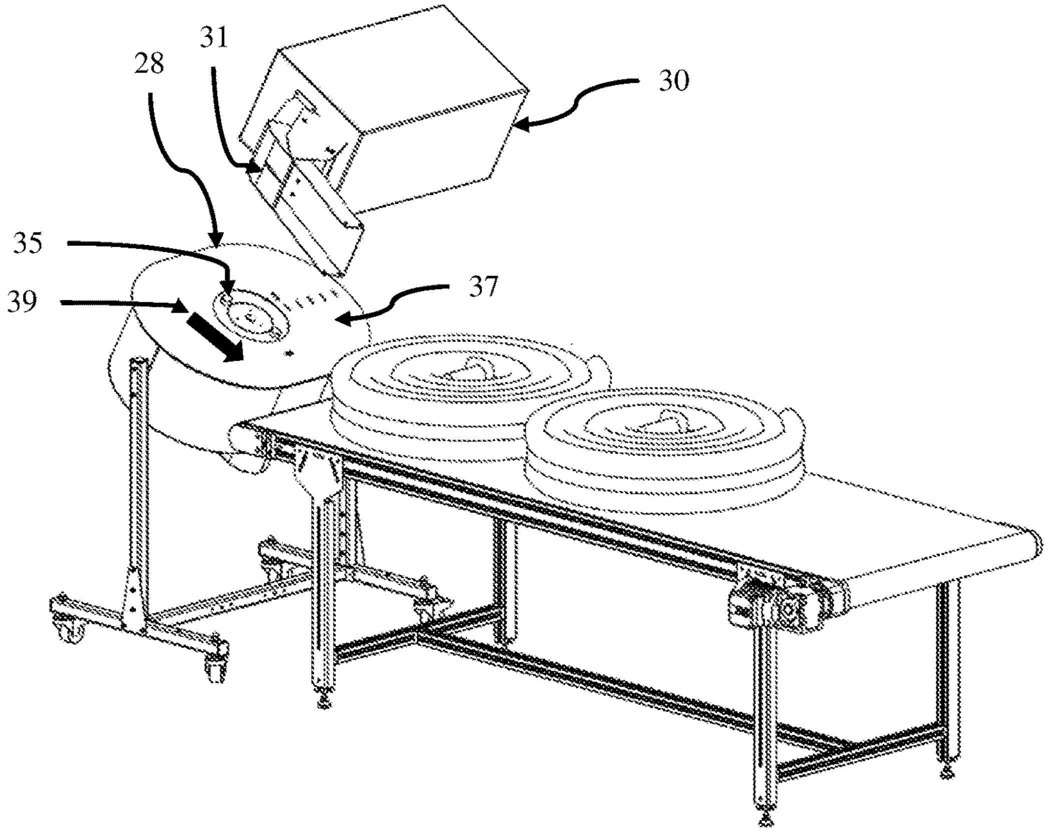
Figure 12:
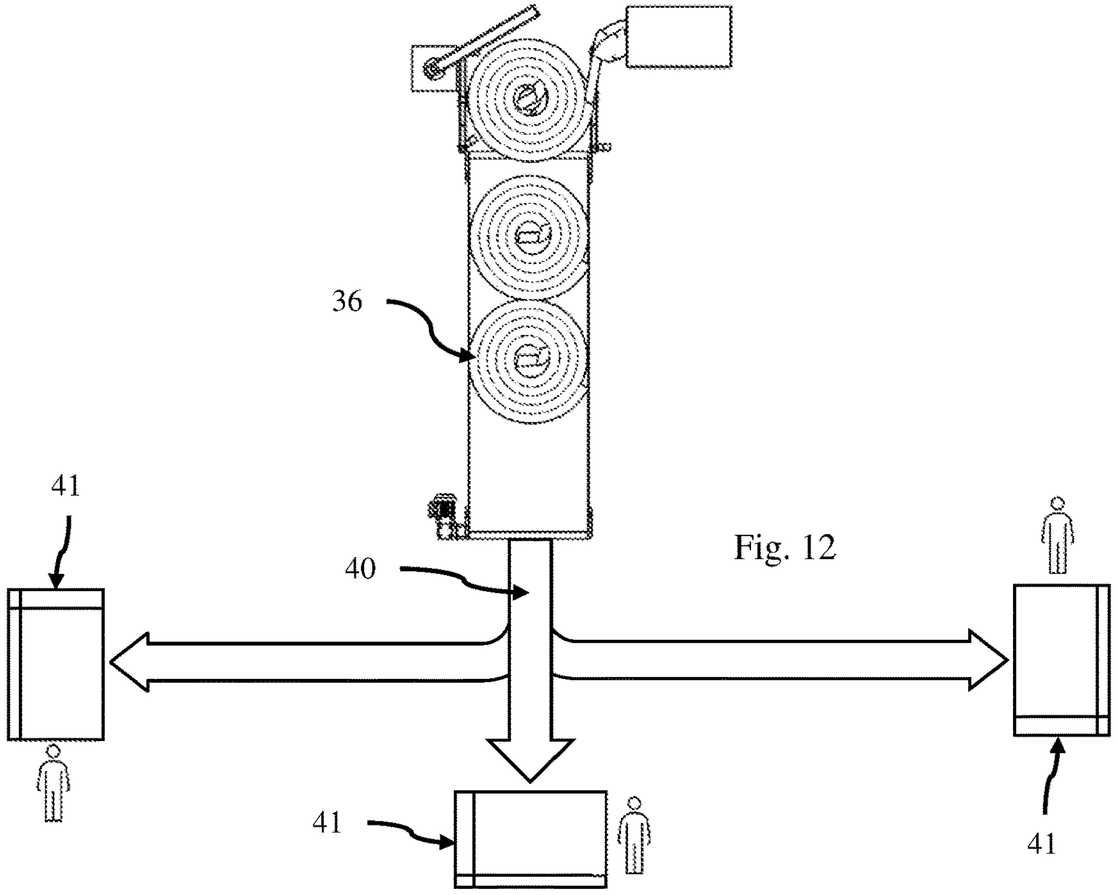

FIGS. 4-5 illustrate an embodiment of the linear movement device coupled to the frame 9 and guiding the frame 9 along a direction 17 parallel to the rotation axis 14. With this invention, the coil winding pins 7, which 1 or more may be flexible, or hinged as same as described in the first invention, can automatically be retracted in a direction along the rotation axis 14 into the main body 1*a* of the coiler device 1, which makes it able that the coiled cushioning material 13 get automatically released from the coiler device winding pins 7 after the strip of dunnage or cushioning material 2 is winded. The coiler device 1 may be positioned vertical or horizontal with the winding pins 7 pointing up or down, according to FIGS. 1 and 8.

The pins 7 may be attached to a separate frame 9, which feed the pins through holes 15 of a floating center rotational plate or gear member 11, which is attached to a driven member 16. The pins 7 can be positioned retracted (FIG. 5), which ablest also a smaller transport packaging for the coiler device 1 and extended (FIG. 4) by a linear movement 17. The linear driven member 16 may be based on a trapezoidal lead screw 18 or an actuator (not shown). A trapezoidal lead screw 18 may be driven by using a transmission 19 and guided by at least one linear guiding member 20, such as a linear bearing.

A trapezoidal lead screw 18 may be provided with at least one bearing 22 to support a rotational movement of the floating center plate or gear member 11. The rotational movement of the floating center plate 11 or frame 9, which including the winding pins 7, may be needed as a separate movement aside from the linear movement, whereby the pins 7 get retracted or extended. The first process may be a rotational movement by a driven member 10 (FIGS. 2 and 2*a*) whereby the pins 7 need to be kept in the extended position. After the rotational process is ended, the pins 7 may be retracted by the driven member 16 into the main body 1*a* of the coiler device 1 or the working surface 8*a* of the rotational center plate 8 or gear member 11. Notably, when retracting or extending, the rotational movement may not be active or activated due to this linear movement.

Figure 6:
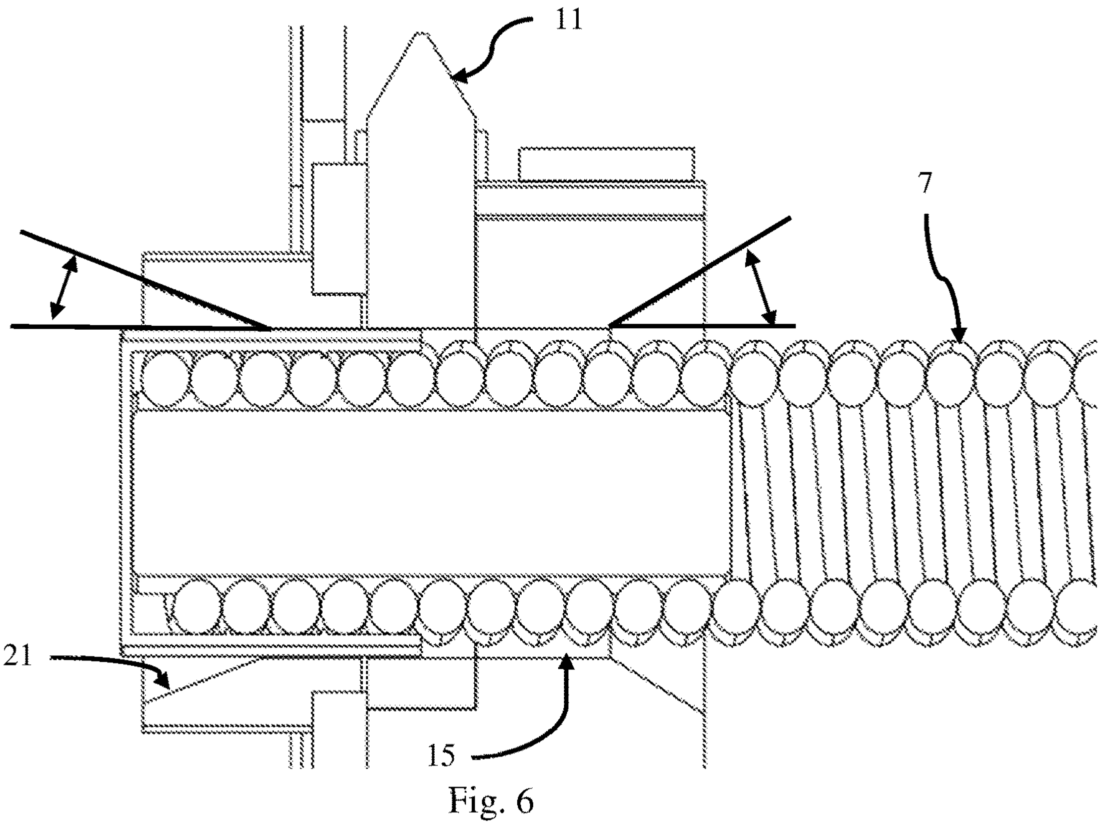
FIG. 6 is a sectional diagram showing the winding ping disposed in the hole of the working plate.

Refer to FIG. 6, the holes 15 where the winding pins 7 are guide through may be provided with an angled slope 21 to ensure the winding pins 7 get linear guided when retracting or extending, may a pin 7 be slightly bend after winding a strip of cushioning material 2. In some embodiments, the holes 15 may also be provided with a linear bearing or low friction material to ensure low friction when the pins move linear through the holes 15 of the floating center rotational plate or gear member 11.

Figure 7:
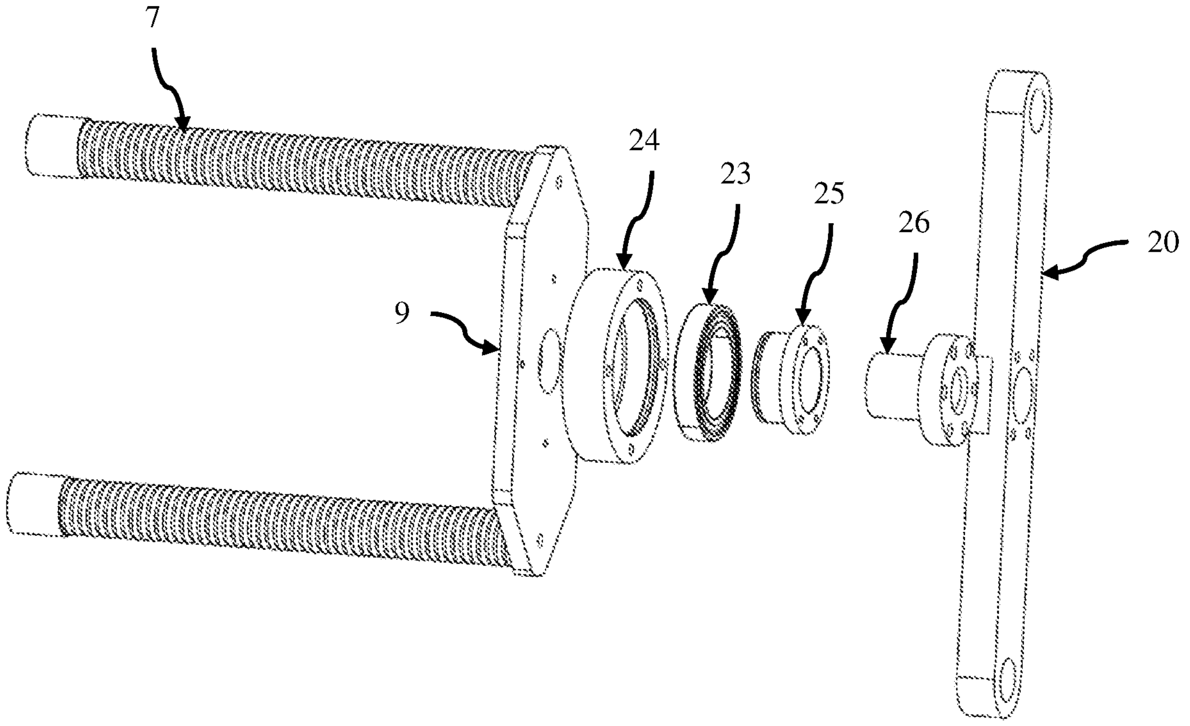
FIG. 7 is an explosive diagram showing some elements connected to the frame.

Refer to FIG. 7, which is an explosive diagram showing some elements connected to the frame 9. A center positioned roller bearing 23 may be used which may be mounted in an outer bearing sleeve 24 and an inner bearing sleeve 25 whereby the shaft of an actuator is guided through, or a trapezoidal thread spindle nut 26 is center positioned, able to have an independent rotational movement of the floating center plate or gear member 11 and/or a linear movement of the pins 7.

In other embodiments, only a part of the winding pins is designed to be retractable into the main body of the coiler device or from the floating center plate or gear member, for example, one of two winding pins is retractable, or two of three winding pins are retractable. In addition, the number of the holes of the floating center rotational plate or gear member may correspond to the number of the winding pins designed to be retractable into the main body of the coiler device through the holes respectively.

FIGS. 8-14 illustrates some embodiment of a coiler device 1 configured to wind a strip of cushioning material 2 fed by a cushioning dispenser 3 and release the formed coils 13 of cushioning material. With this invention the coiler device 1 can positioned horizontal 27 (FIG. 8) or may be positioned in an angle 28 (FIG. 11), whereby the winding pins 29 facing upwards. Also, a cushioning dispenser 30 or his outlet or chute 31 may be positioned in such way that the strip of dunnage or cushioning material 32 line up with the horizontal or angled positioned coiler device 1.

Figure 13:
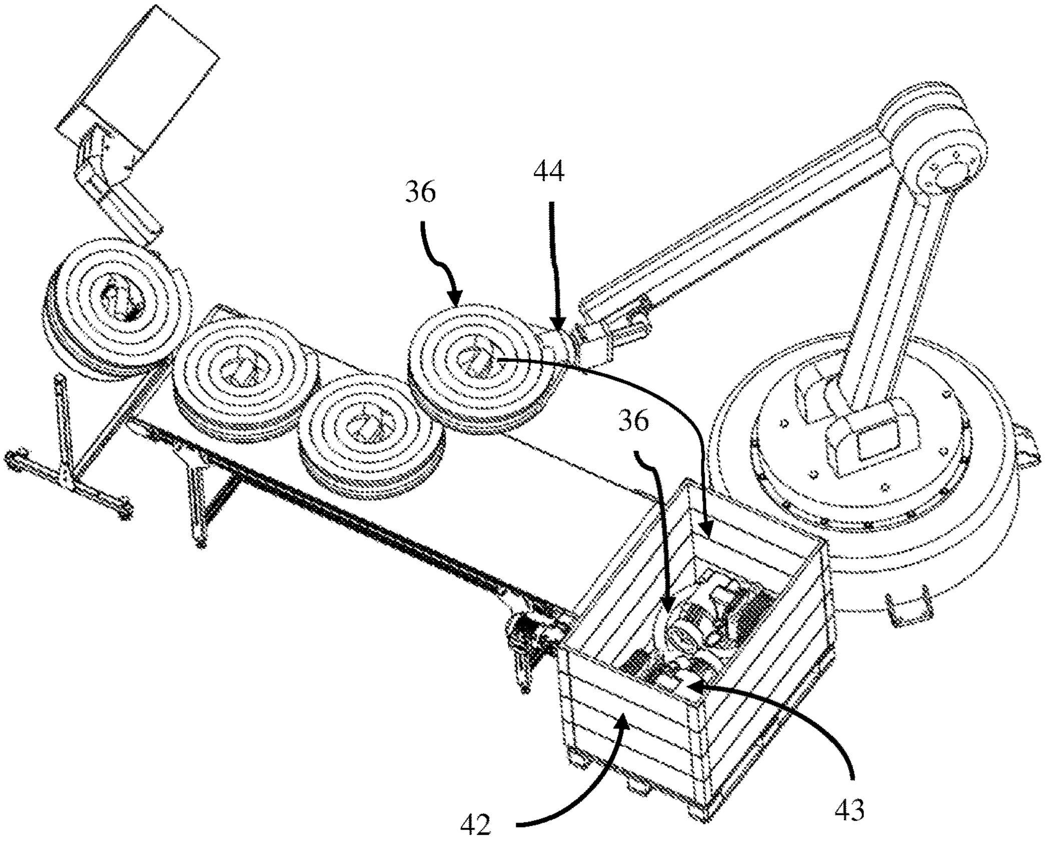
Figure 14:
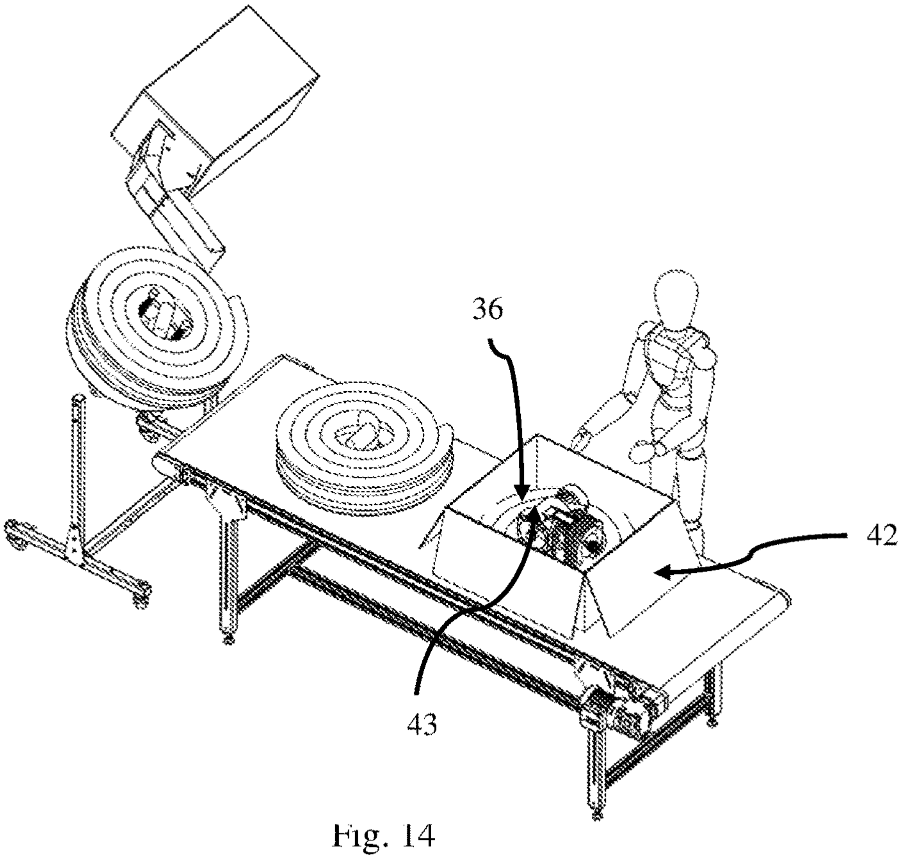
Figure 19:
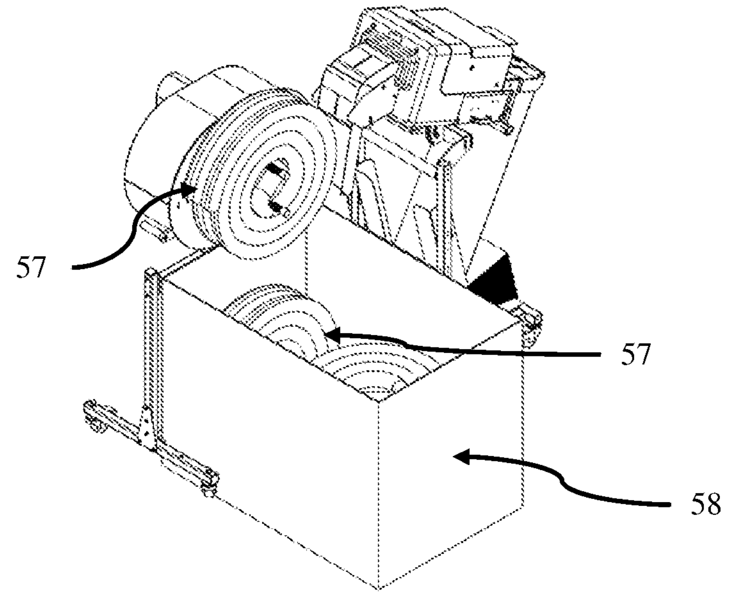
FIG. 19 is a schematic diagram showing a coiler device configured to wind a strip of cushioning material fed by a cushioning dispenser and release the formed coils of cushioning material, according to one embodiment of the present invention.

The horizontal or angled positioned working surface 27 of the coiler device 1 may be leveled or in line 33 with a table/conveyor line 34 or above a collector BIN 58 (FIG. 19). As with this invention, the winding pins can be retracted 35 into the main body 1*a* of the coiler device 1 whereby the coiled cushioning material 36, which may be in an open or closed configuration, do get released and free movable on the working surface 37 of the coiler device 1. The coiled cushioning material 36 may be manually pushed, automatically pushed 38, pulled, or slide 39 onto a packing table, conveyor transport line 34 or collector device/BIN 58. In FIG. 13, the coiled cushioning material 36 can be automatically picked and positioned into a final packaging 42 of products 43 by a robotic or suction device 44. In FIG. 14, the coiled cushioning material 36 can be manually picked and positioned into a final packaging 42 of products 43.

Figure 15:
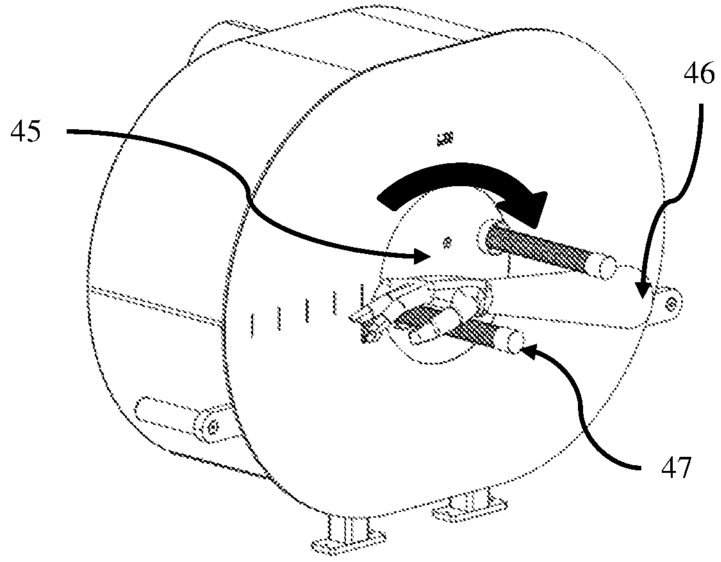
FIG. 15 is a schematic diagram showing an embodiment of the coiler device according to the present invention.
Figure 16:
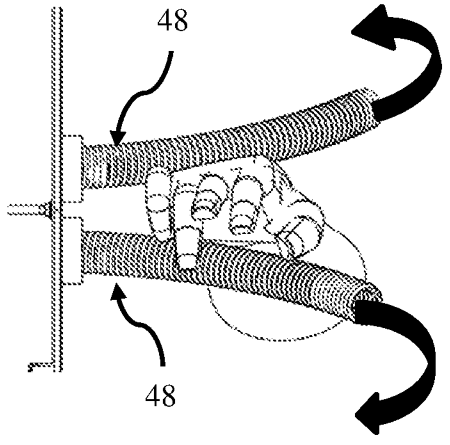
FIGS. 16 and 17 schematic diagram showing embodiments of the winding pins.
Figure 17:
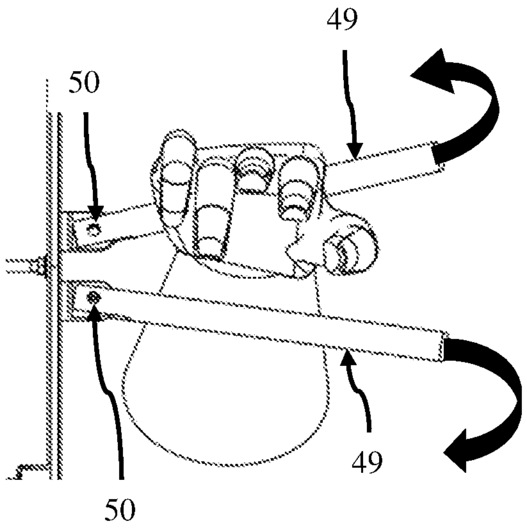

FIGS. 15-17 illustrate some embodiments of the coiler device with two winding pins 47. When the center driven rotational plate 45 is rotating, there is a risk for the human arm 46 or object to be injured by the two winding pins 47. Thus, in FIG. 16, at least one of the winding pins 48 are formed of flexible part 48 such as a spring-like rod. In FIG. 17, at least one of the winding pins 47 include a solid arm 49 connected by a hinge 50.

Figure 18:
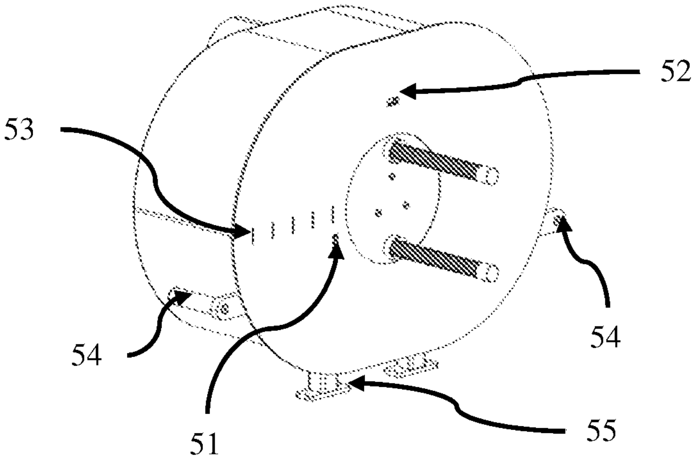
FIG. 18 is a schematic diagram showing an embodiment of the coiler device according to the present invention.

In the embodiment of the coiler device as shown in FIG. 18, some detection elements 51, 52 such as sensors are equipped on the working surface. The detection element 51 is used to determine whether a strip of dunnage or cushioning material 2 reached into the coil winding pins 7 after set time. If no detection, within set time, the center coil plate with pins will not start a rotational movement, to reduce unnecessary movement. The detection element 52 is used to determine whether a strip of dunnage or cushioning material 2 is in a winding process. If no detection, within set time, the center coil plate with pins will stop the rotational movement, to reduce unnecessary movement. Visual scale 53 of coiled material diameter is a tool for determination needed diameter for a new packaging. This way a user does not need to measure a coiled strip of dunnage or cushioning material 2, with a separate measuring tool able to indicate the needed diameter. The increasement of scale marks per mm or cm is depending on the strip of dunnage or cushioning application or required accuracy. In addition, the coiler device includes also lifting handles 54 and a mounting base for positioning on stand, table, or various integration solutions.

Refer to FIG. 19, it can be realized that the coiled cushioning material 57 may be collected in a BIN 58 to transport to multiple packaging areas.

Figure 20:
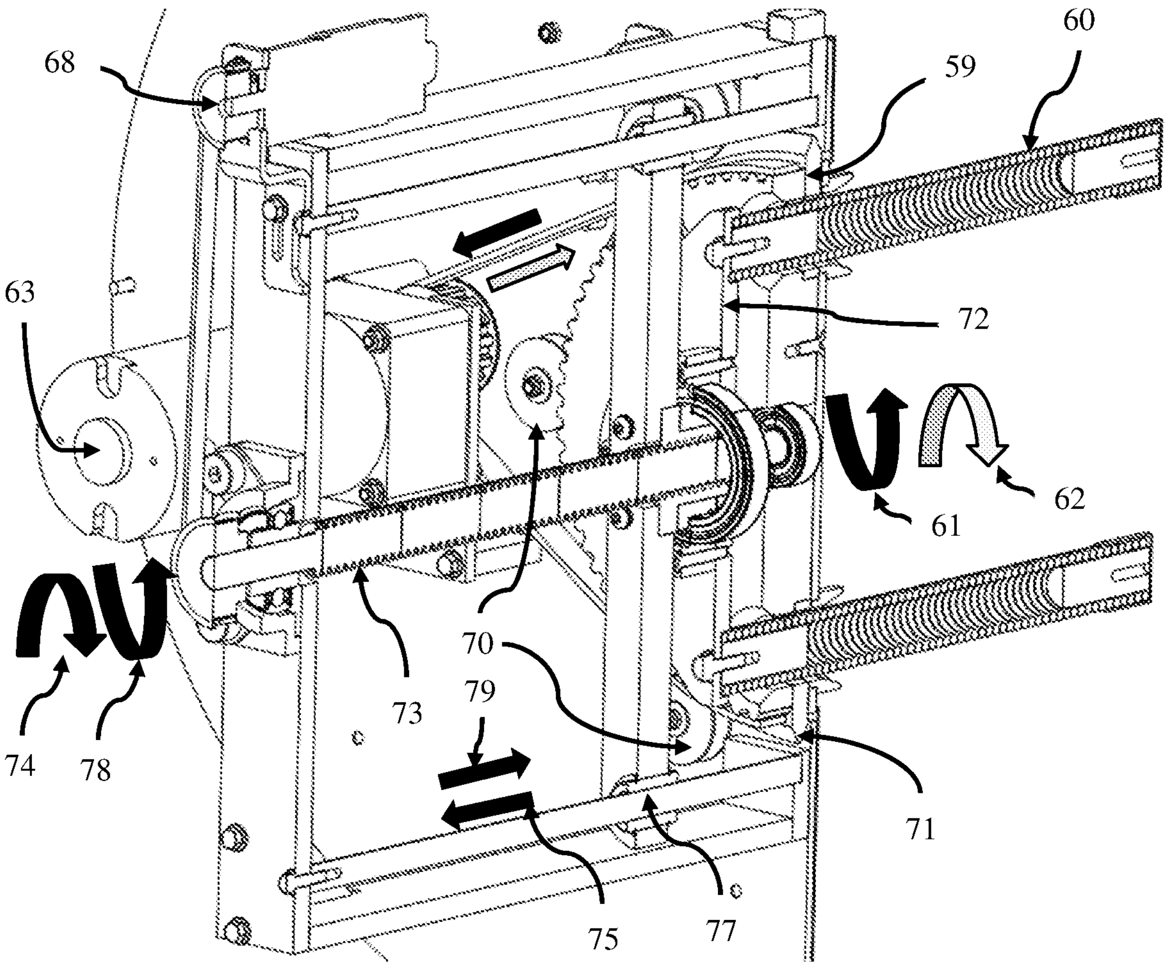
FIG. 20 is a partial sectional diagram showing the internal mechanism for driving the working plate and the frame, according to an embodiment of the present invention.
Figure 21:
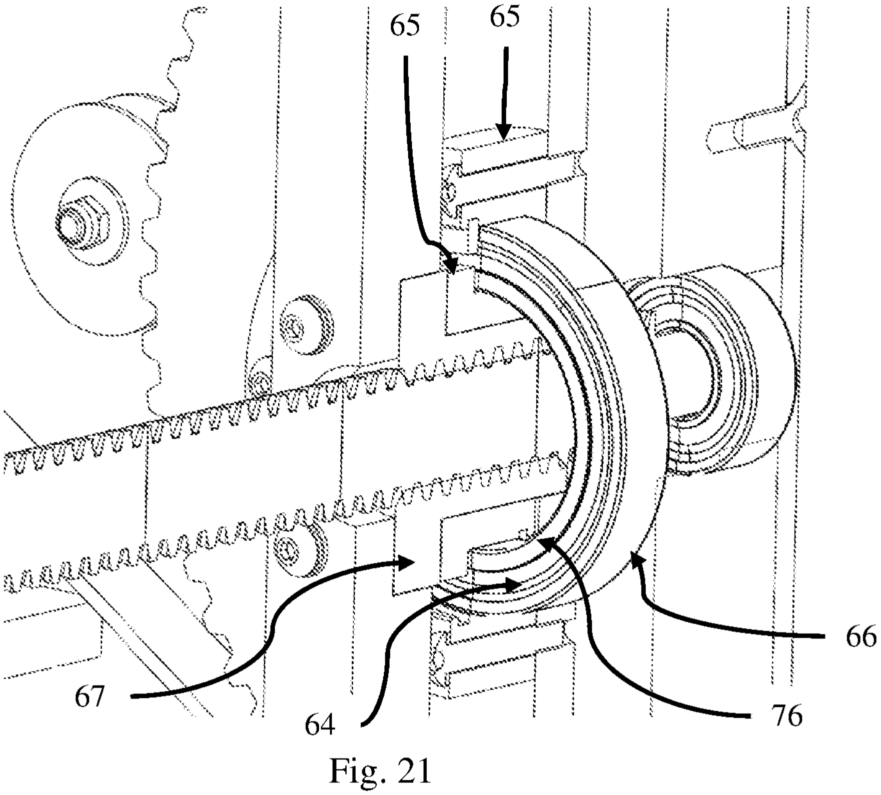
FIG. 21 is an enlarged diagram of a portion of FIG. 20, showing more details of the mechanism that causes the linear movement of the frame and the mechanism that causes the rotational movement of the working plate.

Refer to FIGS. 20 and 21 simultaneously. Disposed on the rotational center plate with/or gear member 59, the coil winding pins 60 can turn only in 1 direction. This may be clockwise 61 or counterclockwise 62. When the driven member 63 starts rotating, a center positioned roller bearing 64, possible fixated in an inner and outer bearing unit/sleeve 65, starts to drive one of his bearing rings, which may be the outer ring 66 of the center-positioned roller bearing. It is appreciated by the skilled person in the art that, the inner bearing ring, which may be positioned on an actuator shaft or a trapezoidal lead nut 67 will be kept from rotating by a brake or the holding torque of a driven member/gearbox 68. The driven rotational center plate may be a center driven or floating member 59, kept from axial and radial movement by at least 1 bearing or track guider member 70 which may be guided by a U or V shaped profile 71 at the outer edge of the center driven or floating member 59. The shape of the outer edge of the at least 1 bearing or track guider member 70 can be complementary to that of the outer edge, namely the U or V shaped profile 71, of the center driven or floating member 59.

When the coiled cushioning material is winded to the set length or diameter, the driven member 63 may stop rotating. The coil winding pins may now be retracted into the coiler device. The coil winding pins 60 may be connected, via a frame member 72, to an actuator (not shown) or possible to a driven trapezoidal lead screw 73. When the driven member 68, connected to the coil winding pins frame member 72, starts to pull, or rotate 74, the coil winding pins get retracted 75 into the coiler device 1, guided on the inner ring 76 of a center positioned roller bearing. The outer bearing ring 66 will be kept from rotating by a brake or the holding torque of the driven member/gearbox 63. An actuator shaft or trapezoidal lead nut kept from rotating by at least 1 linear guiding member 77. After the coiled cushioning material is released from the coil winding pins 60, the coil winding pins/frame member 72 may get reverse driven 78 back to the extended position 79. A new cycle may be started afterwards.

Through the embodiments of the present invention, at least one of the following objectives can be achieved: (1) there is no need for a coiler winding device enclosure, safety cage or high-end driven and/or monitoring safety torque devices which requiring to control or monitor the safety of solid rotating coiler device winding pins to ensure the safety for the user; (2) In addition, no need for additional moving, driven and/or hinging parts or devices to remove the produced coiled cushioning material from the winding pins. Therefore, no need for a coil pushing or pulling device: enclosure, safety cage or high-end driven and/or monitoring safety torque devices which requiring to control or monitor the safety, of moving parts to remove the coiled cushioning material from the coiler device winding pins to ensure the safety, for the user; (3) Possible to position the coiler device in a vertical, angled, or horizontal position whereby the coiled cushioning material get released from the coiler device surface, able to use the ready coiled cushioning material for common and simple packing area or coil transport solutions and able to pre-produce a small to high volume/amount of coiled cushioning stock material.

Through the embodiments of the present invention, at least one of the following efficacies can be produced: (1) A low-cost automated winding and coil releasing device as no additional external moving parts, safety cage or high-end electronic safety monitoring devices are required to ensure safety of moving parts. Estimated to be up to 40-50% lower in manufacturing cost versus existing solutions/systems, without giving in on any performance and/or functionality; (2) Smaller in footprint automated winding and coil releasing device as no additional external moving parts or a safety cage is required; (3) Stand-alone coiler device which can be integrated/combined with the most common strip of dunnage or strip of cushioning dispensers as the coiler device needed communication/connection with an external dispenser; (4) Lower maintenance automated winding and coil releasing device due to limited parts and no need for high-end electronic safety monitoring devices; (5) Lightweight automated winding and coil releasing device versus existing systems due to limited needed parts. This coiler device may be able to lift [≤50 kg] by 2 people or common lifting device to install on a stand or integrated solution; (6) Due to the small footprint and lightweight device solution able to pack and stack 2 complete coiler devices on a common EU pallet, ≤1.2 m height, reducing transport and storage space.

While the invention has been described in terms of what is presently considered to be the most practical and preferred embodiments, it is to be understood that the invention needs not be limited to the disclosed embodiments.

INDUSTRIAL APPLICABILITY

Through the abovementioned embodiments, it is possible to position the coiler device in a vertical, angled, or horizontal position whereby the coiled cushioning material get released from the coiler device surface, able to use the ready coiled cushioning material for common and simple packing area or coil transport solutions and able to pre-produce a small to high volume/amount of coiled cushioning stock material. As a result, the present invention has good industrial applicability.

I claim:

1. A coiler device for winding a strip of cushioning material into a coil, comprising:

a working plate having a working surface, a rotation axis and one or more holes through the working surface;

at least two winding pins disposed through the one or more holes of the working plate and protruding out of the working surface when winding the strip;

a rotational driven member coupled to the working plate, wherein the rotational driven member is configured to automatically rotate the working plate to wind the strip into the coil; and a linear driven member coupled to the at least two winding pins, wherein the linear driven member is configured to automatically retract the at least two winding pins, wherein the at least two winding pins are retractable from the working surface through the one or more holes of the working plate to release the coil.

2. The coiler device as claimed in claim 1, further comprising:

a frame having a rotation axis as that of the working plate, wherein the at least two winding pins are attached to the frame; and wherein the linear driven member is coupled to the frame to guide the frame along a direction parallel to the rotation axis.

3. The coiler device as claimed in claim 2, wherein the frame is disposed near one side of the working plate opposite to the working surface.

4. The coiler device as claimed in claim 2, wherein the linear driven member includes a trapezoidal lead screw or an actuator shaft disposed along the rotation axis, and the frame is rotatable around the trapezoidal lead screw or the actuator shaft.

5. The coiler device as claimed in claim 4, wherein a bearing is disposed between the frame and the trapezoidal lead screw or the actuator shaft.

6. The coiler device as claimed in claim 4, wherein the linear driven member is connected to a transmission.

7. The coiler device as claimed in claim 1, wherein the working plate is facing upward.

8. The coiler device as claimed in claim 7, wherein an angle of a predetermined degree occurs between the working plate and a horizontal level.

9. The coiler device as claimed in claim 1, wherein at least one of the at least two winding pins is bendable.

10. The coiler device as claimed in claim 1, wherein the at least two winding pins are made of flexible materials or have hinging portions protruding out of the working surface respectively.

11. The coiler device as claimed in claim 1, wherein a detection sensor is disposed on the working surface, and the detection sensor is configured to detect whether the strip of the cushioning material is in a winding process.

12. A coiler device for winding a strip of cushioning material into a coil, comprising:

a main body;

a working plate having a working surface and a rotation axis;

at least two winding pins protruding out of the working surface when winding the strip;

a rotational driven member coupled to the working plate, wherein the rotational driven member is configured to automatically rotate the working plate with respect to the rotation axis to wind the strip into the coil; and a linear driven member coupled to the at least two winding pins, wherein the linear driven member is configured to automatically retract at least one of the two winding pins into the main body to release the coil.

13. The coiler device as claimed in claim 12, wherein:

the working plate includes at least one hole away from the rotation axis; and the at least one of the two winding pins is disposed through the at least one hole to be retractable into the main body through the at least one hole.

14. The coiler device as claimed in claim 12, wherein the working plate does not rotate when the at least one of the two winding pins is retracted into the main body.

15. The coiler device as claimed in claim 12, further comprising a visual scale disposed on the working surface for indicating a diameter of the coil of the cushioning material, wherein the rotational driven member stops rotating the working plate when the coil of the cushioning material is winded to a set diameter.

16. The coiler device as claimed in claim 12, further comprising at least one bearing or track guider member, wherein:

the working plate has a U or V shaped profile at an outer edge thereof; and the at least one bearing or track guider member is guided by the U or V shaped profile so that the working plate is kept from radial and axial movements.

17. A coiler device for winding a strip of cushioning material into a coil, comprising:

a working plate having a working surface and a rotation axis; and at least two winding pins disposed away from the rotation axis and protruding out of the working surface when winding the strip, wherein at least one of the at least two winding pins are at least partially formed from a flexible material or hinged adjacent to the working plate to allow bending or pivotable movement of the at least one of the at least two winding pins.

18. The coiler device as claimed in claim 17, wherein the at least one of the at least two winding pins is made of the flexible material.

19. The coiler device as claimed in claim 17, wherein the working plate includes at least two holes away from the rotation axis, and the at least two winding pins are disposed through the at least two holes respectively and protruding out of the working surface when winding the strip.

20. The coiler device as claimed in claim 19, wherein the at least two winding pins are disposed on a frame having a rotation axis the same as that of the working plate.

21. The coiler device as claimed in claim 20, further comprising:

a linear drive member coupled to the frame to guide the frame along a direction parallel to the rotation axis to retract the at least two winding pins from the working surface.

* * * * *